No. 620,739. Patented Mar. 7, 1899.
P. T. CHRISTENSEN.
SPLICE FOR OLD WIRE CABLES.
(Application filed Mar. 24, 1898.)
(No Model.)
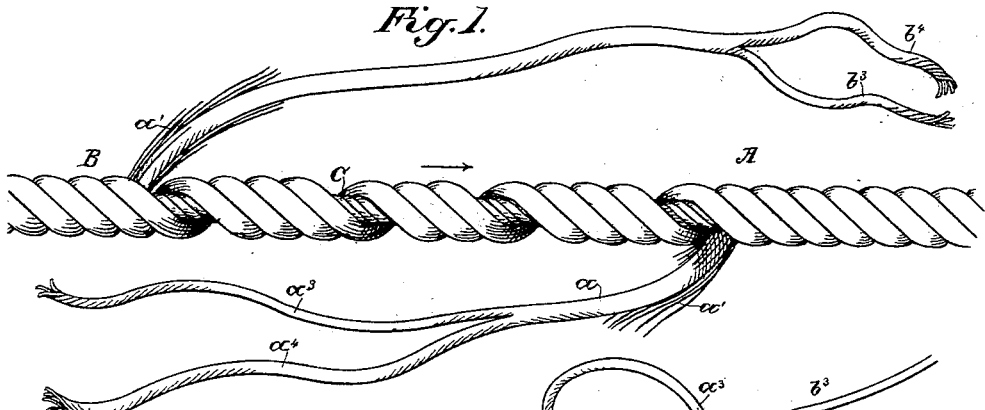
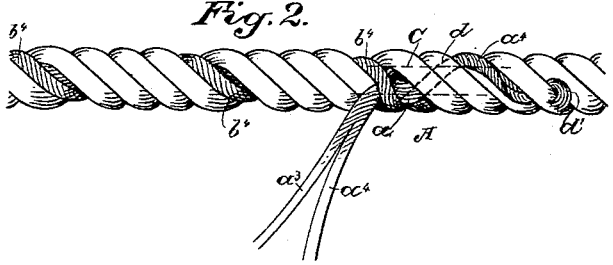
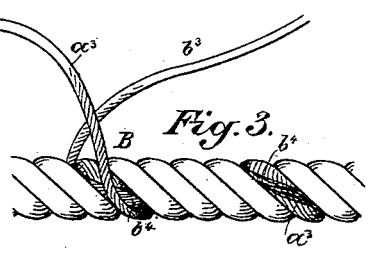
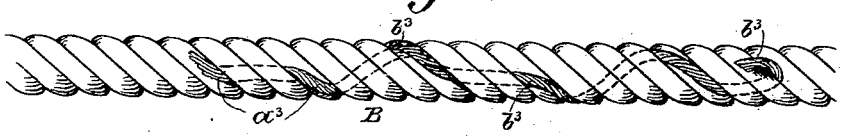
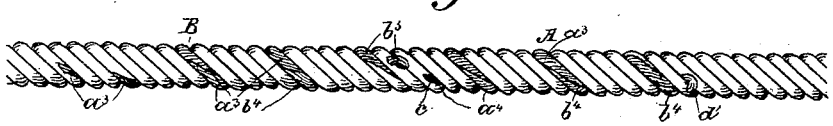
Witnesses,
Inventor,
Peter T. Christensen
By Dewey Strong & Co
attys

UNITED STATES PATENT OFFICE.

PETER T. CHRISTENSEN, OF SAN FRANCISCO, CALIFORNIA, ASSIGNOR TO THE WASHBURN & MOEN MANUFACTURING COMPANY, OF WORCESTER, MASSACHUSETTS.

SPLICE FOR OLD WIRE CABLES.

SPECIFICATION forming part of Letters Patent No. 620,739, dated March 7, 1899.

Application filed March 24, 1898. Serial No. 674,952. (No model.)

*To all whom it may concern:*

Be it known that I, PETER T. CHRISTENSEN, a citizen of the United States, residing in the city and county of San Francisco, State of California, have invented an Improvement in Splices for Old Wire Cables; and I hereby declare the following to be a full, clear, and exact description of the same.

My invention relates to a means for splicing old or worn-out wire cables.

It consists in the improved splice hereinafter described and claimed.

Figure 1 shows the position of the cable ready to be spliced, the two opposite strands separated. Fig. 2 shows the tucking under of the four wires from the tail end. Fig. 3 shows the tail end with the three wires from the head end and those from the tail end ready to be tucked. Fig. 4 shows them tucked under. Fig. 5 shows the rope after the splice has been completed.

The object of my invention is to provide a splice which can be employed for repairing old and worn-out wire cables, this splice not being suitable for the uniting of new cables, nor is there any splice which is employed for uniting new cables which is suitable for this work.

It is especially designed to be employed for the splicing of what is known as the "Lang" lay cables, in which the strand and the rope both have the lay or twist in the same direction, (to the right.)

Wire cables such as are used for cable-railways and for similar work consist of a central core, usually of manila rope, surrounded by six strands, each of which strands has a central wire with six wires twisted around it and a supplemental covering of twelve more smaller wires around the six, thus forming nineteen wires to each strand or one hundred and fourteen wires to the cable. The constant wear and friction on this class of ropes caused by the slipping through the grips of cable-cars will soon wear out the outer layers composed of twelve wires, as above described, and when these are badly worn it is necessary to splice the rope, else the broken wires will become entangled in the grip and will make trouble. The splice which is made in a cable of this class is usually about seventy-five feet in its double length. The ends which are to be spliced are first untwisted so that the strands are separated for thirty or forty feet from the end. The two parts are then brought together so that the portions which have not been untwisted are made to approximately abut together, leaving the loose ends of the strands spread out and ready for the process of splicing. In making the splice the six strands which form the cable will be of different lengths—as, for instance, the longest strand will be laid into the channel formed by untwisting the corresponding strand from the opposite portion of the cable and may extend thirty-five or forty feet. The next strand would be approximately ten or twelve feet shorter than the first and the next ten or twelve feet shorter than the second, and so on, until the last strand in each direction might not extend over five or six feet from the actual meeting-point of the two. With this explanation of the character of the cables to be spliced and the manner in which the strands are to be placed I will now explain more particularly my method of forming the splice. The strand having been laid into place, as previously stated, the stubs and worn broken outside wires $a'$ are turned back, exposing the seven inner wires of the strand for a distance of three or four feet from the end. These inner wires are then untwisted so as to form two separate strands, one containing four and the other three wires. The part of the rope in the direction toward which the cable is to run I will call the "head" A and the opposite direction I will call the "tail" B of the rope. The four-strand part from the tail B, which is represented at $b^4$, is laid in toward the head A in the channel which is formed by unwinding the corresponding strand $a$ of the head A sufficiently for the purpose. The needle which is used in splicing is then introduced back of the parted strand $a$, passing over the heart or center C of the cable, then under the next two separated strands of four and three wires, and finally under the next two complete strands of the head portion A of the cable. (Shown at $d$.) The four-wire strand $b^4$ is then put through the hole thus made by the needle and pulled tight. It is then bent back upon itself over the seven-wire strands $a$, then passed under this and the next two, then bent back so as to form a small hook, and is cut off close, as at $d'$. The three-wire section $d^3$ from the head end is then passed under and over the four-wire strand $b^4$ so as to wrap around it two or three times, and it practically takes the place of the three wires $b^3$ from the tail end B, which have been previously separated from their corresponding four wires $b^4$. This three-wire strand $d^3$, being thus wrapped around the four-wire strand $b^4$ from the opposite direction for approximately about fourteen inches, is then fastened by again taking a needle and opening up the space between the main strands of the cable, so that it can be pulled through once or twice, turned over, and cut off. The three-wire strand $b^3$ from the tail end is then tucked through in the same manner at the point where it meets the four-wire strand tucked from the head end. The four-wire strand $d^4$ from the head is then tucked and fastened in the same manner at the head of this tuck, as shown at $c$. Each of the seven-wire strands is treated in the same manner, it being understood, as previously described, that the finishing-point of each of these strands is approximately ten or twelve feet apart, so that they are not all bunched in any one place. By thus forming the splice with two "tucks," as they are technically called, for each strand, I have a double strength for the strand, so that if one tuck should carry away, the other will still hold. In this manner I only cut away the small outside wires $a'$ back to the point where the splice is to terminate, and all the inside stubs and broken small wires are left undisturbed, bedding and fitting against the central heart C of the cable, so that the cable is kept up to about its normal size, although when a cable is worn it is always considerably smaller than when it is new. If it was attempted to splice this worn-out cable by the class of splice which was used for a new cable, all these broken wires would have to be disturbed, the rope would all be broken up and made very much smaller; but by my method of splicing I only remove these outside wires for a distance equal to the length of the splice.

The practical advantage I have found to result by making splices of this sort is that where a splice of an old cable made by the ordinary methods will wear out in ten or twelve days a splice made by the method herein described has lasted on the hardest-worked roads for a term of forty-five days.

Having thus described my invention, what I claim as new, and desire to secure by Letters Patent, is—

1. A rope or cable having ends united by a splice said splice consisting of opposing sections abutting together and each having projecting strands of different lengths and composed of a plurality of wires, untwisted and divided into groups, said groups of each section of rope or cable alternately laid upon each other from opposite directions and occupying the grooves or channels previously occupied by original undivided strands, and having their ends tucked under strands and secured.

2. A rope or cable having a splice and wherein the cable and the strands composing it all have the lay or twist in the same direction, said rope having the strands of its ends first stripped of inclosing wires and laid open, and formed of different lengths to approximately divide the space between the untwisted abutting ends of the rope or cable and the end of the longest strand, the wires of the strands divided into groups with one group of each strand of one end of the rope and another group of each strand of another end of the rope laid into the same grooves or channels and from opposite directions.

3. A rope or cable having abutting head and tail sections with untwisted ends or strands of different lengths and each formed of wires separated into groups containing odd and even numbers of independent wires, the groups of even number of wires from one end of the rope and the groups of odd number of wires from another end of the rope alternately laid upon each other from opposite directions and jointly occupying the channels or grooves previously occupied by undivided strands, and the ends of said groups of wires terminating at different points in the length of the splice and tucked under the strands and folded over.

In witness whereof I have hereunto set my hand.

PETER T. CHRISTENSEN.

Witnesses:
  S. H. NOURSE,
  JESSIE C. BRODIE.